United States Patent
Leflaive et al.

(10) Patent No.: US 12,247,171 B2
(45) Date of Patent: Mar. 11, 2025

(54) METHOD FOR CAPTURING ORGANOMETALLIC IMPURITIES IN THE PRESENCE OF A CAPTURE MASS ON A MESOPOROUS-MACROPOROUS SUPPORT

(71) Applicant: IFP Energies nouvelles, Rueil-Malmaison (FR)

(72) Inventors: Philibert Leflaive, Rueil-Malmaison (FR); Etienne Girard, Rueil-Malmaison (FR); Antoine Fecant, Rueil-Malmaison (FR)

(73) Assignee: IFP Energies nouvelles, Rueil-Malmaison (FR)

(*) Notice: Subject to any disclaimer, the term of this patent is extended or adjusted under 35 U.S.C. 154(b) by 71 days.

(21) Appl. No.: 18/037,137

(22) PCT Filed: Nov. 18, 2021

(86) PCT No.: PCT/EP2021/082068
§ 371 (c)(1),
(2) Date: May 16, 2023

(87) PCT Pub. No.: WO2022/112080
PCT Pub. Date: Jun. 2, 2022

(65) Prior Publication Data
US 2023/0416617 A1 Dec. 28, 2023

(30) Foreign Application Priority Data
Nov. 27, 2020 (FR) ...................... 2012320

(51) Int. Cl.
*C10G 25/00* (2006.01)
*B01J 20/02* (2006.01)
*B01J 20/08* (2006.01)
*B01J 20/28* (2006.01)
*B01J 20/32* (2006.01)

(52) U.S. Cl.
CPC ........ *C10G 25/003* (2013.01); *B01J 20/0225* (2013.01); *B01J 20/08* (2013.01); *B01J 20/28061* (2013.01); *B01J 20/28073* (2013.01); *B01J 20/28092* (2013.01); *B01J 20/3204* (2013.01); *B01J 20/3236* (2013.01); *B01J 20/3293* (2013.01); *C10G 2300/202* (2013.01); *C10G 2300/205* (2013.01); *C10G 2400/02* (2013.01)

(58) Field of Classification Search
CPC .. B01J 20/0225; B01J 20/08; B01J 20/28059; B01J 20/28071; B01J 20/3078; B01J 20/3204; B01J 20/3225; B01J 20/3236; B01J 20/0237; B01J 20/0244; B01J 20/28004; B01J 20/28064; B01J 20/28073; B01J 20/28076; B01J 20/3214; B01J 20/28083; B01J 20/28085; B01J 20/28092; C10G 25/003; C10G 2300/202
See application file for complete search history.

(56) References Cited

U.S. PATENT DOCUMENTS

| | | | |
|---|---|---|---|
| 5,266,300 A | 11/1993 | Harrison | |
| 6,033,556 A * | 3/2000 | Didillon | B01J 37/0018 585/852 |
| 6,589,908 B1 | 7/2003 | Ginestra et al. | |
| 6,896,795 B2 | 5/2005 | Didillon et al. | |
| 6,972,086 B2 | 12/2005 | Didillon et al. | |
| 7,790,130 B2 | 9/2010 | Kanazirev | |
| 7,901,567 B2 | 3/2011 | Coupard et al. | |
| 2017/0129781 A1* | 5/2017 | Boualleg | B01J 20/28092 |
| 2021/0146330 A1 | 5/2021 | Crozet et al. | |

FOREIGN PATENT DOCUMENTS

| | | | |
|---|---|---|---|
| FR | 2764214 A1 | 12/1998 | |
| WO | WO-2019197352 A1 * | 10/2019 | B01J 20/0225 |

OTHER PUBLICATIONS

WO 2019/197352, translation (Year: 2019).*
International search report PCT/EP2021/082068 dated Jan. 20, 2022 (pp. 1-2).

* cited by examiner

Primary Examiner — Randy Boyer
Assistant Examiner — Juan C Valencia
(74) Attorney, Agent, or Firm — Millen, White, Zelano & Branigan, P.C.; Brion P. Heaney

(57) ABSTRACT

The invention relates to a method for capturing organometallic impurities in a gasoline-type hydrocarbon feedstock containing sulfur compounds and olefins, wherein said feedstock is brought into contact with hydrogen and a capture mass comprising a nickel-based active phase, and a mesoporous and macroporous alumina substrate having a bimodal distribution of mesopores and wherein: —the volume of mesopores having a diameter greater than or equal to 2 nm and less than 18 nm corresponds to between 10 and 30% by volume of the total pore volume of said substrate; —the volume of mesopores with a diameter greater than or equal to 18 nm and less than 50 nm corresponds to between 30 and 50% by volume of the total pore volume of said substrate.

19 Claims, No Drawings

METHOD FOR CAPTURING ORGANOMETALLIC IMPURITIES IN THE PRESENCE OF A CAPTURE MASS ON A MESOPOROUS-MACROPOROUS SUPPORT

TECHNICAL FIELD

The present invention relates to a process for capturing organometallic impurities contained in a gasoline-type hydrocarbon feedstock containing sulfur compounds and olefins using a nickel-based capture mass.

STATE OF THE ART

Automotive fuel specifications call for a significant reduction in the sulfur content in these fuels, and notably in gasolines. This reduction is notably directed toward limiting the content of sulfur and nitrogen oxides in motor vehicle exhaust gases. The specifications currently in force in Europe since 2009 for gasoline fuels set a maximum content of 10 ppm by weight (parts per million) of sulfur. Such specifications are also in force in other countries, for instance the United States and China, where the same maximum sulfur content has been required since January 2017. To achieve these specifications, it is necessary to treat gasolines via desulfurization processes.

The main sources of sulfur in gasoline bases are "cracking" gasolines, and mainly the gasoline fraction obtained from a process of catalytic cracking of a residue from the atmospheric or vacuum distillation of a crude oil. The gasoline fraction from catalytic cracking, which represents on average 40% of gasoline bases, in fact accounts for more than 90% of the sulfur in gasolines. Consequently, the production of low-sulfur gasolines requires a step of desulfurization of the catalytic cracking gasolines. The removal of sulfur from gasoline cuts involves specifically treating these sulfur-rich gasolines via desulfurization processes in the presence of hydrogen. These are then referred to as hydrodesulfurization processes (HDS). However, these gasoline cuts, and more particularly the gasolines obtained from FCC, contain a large proportion of unsaturated compounds in the form of monoolefins (about 20% to 50% by weight) which contribute toward a good octane number, diolefins (0.5% to 5% by weight) and aromatics. These unsaturated compounds are unstable and react during the hydrodesulfurization treatment. Diolefins form gums by polymerization during the hydrodesulfurization treatments. This gum formation leads to gradual deactivation of the hydrodesulfurization catalysts or gradual clogging of the reactor. Consequently, the diolefins must be removed by hydrogenation before any treatment of these gasolines. Conventional treatment processes desulfurize gasolines nonselectively by hydrogenating a large portion of the monoolefins, giving rise to a high loss of octane number and a high hydrogen consumption. The most recent hydrodesulfurization processes make it possible to desulfurize cracking gasolines rich in monoolefins, while limiting the hydrogenation of the monoolefins and consequently the loss of octane number. Such processes are described, for example, in documents EP-A-1077247 and EP-A-1174485.

The hydrodesulfurization processes are operated continuously over periods of at least 3 to 5 years. The catalysts used to carry out the hydrodesulfurization of sulfur-containing gasolines must therefore have good activity, good selectivity and good stability over time in order to be operated continuously for several years. However, the presence of heavy metals, such as mercury or arsenic, or of contaminants, such as phosphorus and silicon, in the form of organometallic compounds in the hydrocarbon feedstocks to be desulfurized results in a rapid deactivation of the hydrotreating catalysts. It is thus necessary to remove these contaminants from the feedstock before bringing it into contact with these hydrodesulfurization catalysts.

Various solutions are proposed for extracting these impurities and more particularly arsenic in the hydrocarbon feedstocks. In general, a capture mass (adsorbent) is placed either in a reactor located upstream of the hydrodesulfurization unit or in the hydrodesulfurization reactor, upstream of the catalytic bed containing the hydrodesulfurization catalyst. Such adsorbents are described in documents FR2794381 and WO2006/037884. These adsorbents are used in the presence of hydrogen, which presents a drawback when the gasolines to be treated comprise unsaturated compounds. This results in a decrease in octane number and a drop in the quality of the gasoline considered from the stage of adsorption of the impurities. These adsorbents also have the drawback of being relatively catalytically inactive for hydrodesulfurization reactions. Furthermore, they occupy a not inconsiderable volume in the reactor, reducing the volume available for the beds of hydrodesulfurization catalysts, and therefore lead to an overall loss in the performance of the process. It is therefore necessary to seek solutions which make it possible to eliminate these impurities such as arsenic, with the aim of limiting the hydrogenation reactions responsible for a reduction in the octane number of the gasolines concerned. These solutions must also make it possible to increase the hydrodesulfurization performance and without loss of selectivity of the hydrodesulfurization reaction with respect to the hydrogenation of olefins.

Thus, there is still a need to have a capture mass having adsorption properties for heavy metals and optimized catalytic properties, i.e., having a good compromise between the activity in hydrodesulfurization (HDS), and a maximum selectivity of hydrodesulfurization reactions compared to olefin hydrogenation reactions (HDS/HYD) and whose properties of adsorption and catalytic activity after capture are stable over time.

Furthermore, it is known from the prior art that the pore distribution of the support can have a beneficial impact on the catalytic performance.

Document U.S. Pat. No. 6,589,908 discloses a process for the preparation of a catalyst support, which does not contain macroporosity and has a bimodal pore structure in the mesoporosity such that the two modes of porosity are separated by 1 to 20 nm. The support can be used in numerous catalytic applications, and in particular in hydrotreating, in particular in hydrodenitrogenation.

Document U.S. Pat. No. 5,266,300 discloses a method for preparing a porous alumina support for use as a hydrodesulfurization or hydrodemetallization catalyst support, said support comprising a total pore volume between 0.65 to 1.30 $cm^3/g$, said porous support comprising two populations of macropores, of which about 2% to 20% by volume relative to the total pore volume is in the form of macropores having a diameter of between 10 000 angstroms and 100 000 angstroms (1000 and 10 000 nm), about 5% to 30% by volume relative to the total pore volume is in the form of macropores having a diameter of between 1000 angstroms and 10 000 angstroms (100 and 1000 nm), and about 50% to 93% by volume relative to the total pore volume is in the form of mesopores having a pore diameter of between 30 angstroms and 1000 angstroms (3-100 nm).

Documents CN108855197, CN104248987 and CN104248985 disclose catalysts for various catalytic applications (propane dehydrogenation, esterification) whose support has a trimodal pore distribution, the mesopore populations being centered on three peaks respectively between 2 and 4 nm, 5 and 15 nm and 10 and 40 nm.

Document U.S. Pat. No. 7,790,130 discloses an alumina for the capture of halides comprising a trimodal porosity of which 40% to 49% by volume relative to the total pore volume of the support is in the form of pores having a diameter of between 15 and 50 nm.

However, none of the documents of the prior art describes the implementation of a process for capturing organometallic impurities, in particular, contained in a hydrocarbon feedstock in the presence of a capture mass comprising a support having both a bimodal mesoporous porosity, with a high mesopore volume coupled with a specific macropore volume.

In this context, one of the objectives of the present invention is to propose a process for capturing organometallic impurities in a gasoline-type hydrocarbon feedstock containing sulfur compounds and olefins, in which the capture mass comprises an active phase comprising at least nickel, on a mesoporous and macroporous support, presenting both a bimodal mesoporous porosity, with a high mesopore volume coupled with a determined macropore volume. This is because it has been discovered, surprisingly, that the use of this capture mass makes it possible to efficiently capture organometallic impurities, and in particular the arsenic contained in a gasoline containing olefins and sulfur, while limiting the rate of hydrogenation of the olefins to values generally of less than 30%, preferentially of less than 20% and more preferably still of less than 10%.

Indeed, without being linked to any one scientific theory, the use of such a capture mass improves the phenomena of internal diffusion of the reactants and of the products by the presence of populations of different sizes of mesopores. In addition, the combined presence of macroporosity is particularly judicious when the feedstock to be treated contains a significant quantity of reactive olefins (unsaturated compounds), in particular diolefins, which is the case for gasolines, which can give rise to the formation of gums and thus block the porosity of the capture mass without the presence of macroporosity.

SUBJECT MATTER OF THE INVENTION

A subject of the present invention is a process for capturing organometallic impurities in a gasoline-type hydrocarbon feedstock containing sulfur compounds and olefins, in which a capture mass is brought into contact with the feedstock to be treated and a flow of hydrogen at a temperature between 200 and 400° C., a pressure between 0.2 and 5 MPa and a ratio of the hydrogen flow rate to the hydrocarbon feedstock flow rate of between 50 and 800 $Nm^3/m^3$, said capture mass comprising an active phase based on nickel, and a support of mesoporous and macroporous alumina comprising a bimodal distribution of mesopores, and in which:
  the volume of the mesopores with a diameter greater than or equal to 2 nm and less than 18 nm corresponds to between 10 and 30% by volume of the total pore volume of said support;
  the volume of mesopores with a diameter greater than or equal to 18 nm and less than 50 nm corresponds to between 30 and 50% by volume of the total pore volume of said support;
  the volume of the macropores with a diameter greater than or equal to 50 nm and less than 8000 nm corresponds to between 30 and 50% by volume of the total pore volume of said support.

According to one or more embodiments, said support comprises a specific surface area of between 50 and 210 $m^2/g$.

According to one or more embodiments, said support comprises a total pore volume of between 0.7 and 1.3 mL/g.

According to one or more embodiments, the volume of the mesopores with a diameter greater than or equal to 2 nm and less than 18 nm corresponds to between 15 and 25% by volume of the total pore volume of said support.

According to one or more embodiments, the volume of mesopores with a diameter greater than or equal to 18 nm and less than 50 nm corresponds to between 35 and 45% by volume of the total pore volume of said support.

According to one or more embodiments, the volume of the macropores with a diameter greater than or equal to 50 nm and less than 8000 nm corresponds to between 35 to 50% by volume of the total pore volume of said support.

According to one or more embodiments, the nickel content, expressed in NiO form, is between and 65% by weight relative to the total weight of said capture mass.

According to one or more embodiments, the active phase consists solely of nickel.

According to one or more embodiments, the active phase of said capture mass further comprises cobalt, molybdenum and phosphorus.

According to one or more embodiments, the nickel content, expressed in NiO oxide form, is between 5 and 65% by weight relative to the total weight of said capture mass, the cobalt content, expressed in CoO form, is between 0.5 and 10% by weight relative to the total weight of said capture mass, the molybdenum content, expressed in $MoO_3$ form, is between 2 and 20% by weight relative to the total weight of said capture mass, and the phosphorus content, expressed in $P_2O_5$ form, is between 0.2 and 10% by weight relative to the total weight of said capture mass.

According to one or more embodiments, the pore distribution of the mesopores with a diameter greater than or equal to 2 nm and less than 18 nm is centered on a range of values between 10.5 and 14.5 nm.

According to one or more embodiments, the pore distribution of the mesopores with a diameter greater than or equal to 18 nm and less than 50 nm is centered on a range of values between 22 and 28 nm.

According to one or more embodiments, said support comprises a specific surface area of between 70 and 180 $m^2/g$.

According to one or more embodiments, said support is in the form of beads with a diameter of between 2 and 4 mm.

According to one or more embodiments, when said support is in the form of beads, said support is obtained according to the following steps:
  s1) dehydration of an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;
  s2) shaping of said alumina powder obtained in step s1) in the form of beads;
  s3) heat treatment of the alumina beads obtained in step s2) at a temperature greater than or equal to 200° C.;
  s4) hydrothermal treatment of the alumina beads obtained at the end of step s3) by impregnation with water or an aqueous solution, then residence in an autoclave at a temperature between 100° C. and 300° C.;

s5) calcining of the alumina beads obtained at the end of step s4) at a temperature between 500° C. and 820° C.

According to one or more embodiments, the hydrocarbon feedstock is a catalytic cracking gasoline containing between 5% and 60% by weight of monoolefins, between 50 and 6000 ppm by weight of sulfur compounds and between 10 and 1000 ppb of arsenic relative to the total weight of said feedstock.

According to one or more embodiments, the organometallic impurities are selected from organometallic impurities of heavy metals, silicon, phosphorus and arsenic. Preferably, the organometallic impurity is an organometallic arsenic impurity.

DETAILED DESCRIPTION OF THE INVENTION

1. Definitions

Subsequently, the groups of chemical elements are given according to the CAS classification (CRC Handbook of Chemistry and Physics, published by CRC Press, editor-in-chief D. R. Lide, 81st edition, 2000-2001). For example, Group VIII according to the CAS classification corresponds to the metals of Columns 8, 9 and 10 according to the new IUPAC classification.

The BET specific surface area is measured by nitrogen physisorption according to the standard ASTM D3663-03, a method described in the work by Rouquerol F., Rouquerol J. and Singh K., "*Adsorption by Powders & Porous Solids: Principles, Methodology and Applications*", Academic Press, 1999.

In the present description, according to the IUPAC convention, "micropores" are understood to mean the pores having a diameter of less than 2 nm, i.e. 0.002 µm; "mesopores" are understood to mean the pores having a diameter of greater than 2 nm, i.e. 0.002 µm, and less than 50 nm, i.e. 0.05 µm; and "macropores" are understood to mean the pores having a diameter of greater than or equal to 50 nm, i.e. 0.05 µm.

In the following description of the invention, "total pore volume" of the alumina or of the capture mass is understood to mean the volume measured by intrusion with a mercury porosimeter according to the ASTM D4284-83 standard at a maximum pressure of 4000 bar (400 MPa), using a surface tension of 484 dyne/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-5, written by Jean Charpin and Bernard Rasneur.

In order to obtain better accuracy, the value of the total pore volume in ml/g given in the following text corresponds to the value of the total mercury volume (total pore volume measured by intrusion with a mercury porosimeter) in ml/g measured on the sample minus the mercury volume value in ml/g measured on the same sample for a pressure corresponding to 30 psi (approximately 0.2 MPa).

The volume of the macropores and of the mesopores is measured by mercury intrusion porosimetry according to the standard ASTM D4284-83 at a maximum pressure of 4000 bar (400 MPa), using a surface tension of 484 dyne/cm and a contact angle of 140°.

The value at and above which the mercury fills all the intergranular voids is set at 0.2 MPa and it is considered that, above this value, the mercury penetrates into the pores of the sample.

The macropore volume of the catalyst is defined as being the cumulative volume of mercury introduced at a pressure of between 0.2 MPa and 30 MPa, corresponding to the volume contained in the pores with an apparent diameter of greater than 50 nm.

The mesopore volume of the catalyst is defined as being the cumulative volume of mercury introduced at a pressure of between 30 MPa and 400 MPa, corresponding to the volume contained in the pores with an apparent diameter of between 2 and 50 nm.

When the incremental pore volume measured by mercury porosimetry is plotted as a function of the pore diameter, the porosity modes correspond to the inflection points of the function represented.

The metallic element (group VIII metal, group VIB metal) and phosphorus contents are measured by X-ray fluorescence.

2. Description

Process for Capturing Organometallic Impurities

The present invention relates to a process for capturing organometallic impurities such as heavy metals, silicon or phosphorus, and more particularly arsenic, contained in a hydrocarbon feedstock, employing a capture mass as defined below, wherein said capture mass is brought into contact with the hydrocarbon feedstock in the presence of hydrogen. Within the meaning of the present invention, the capture process according to the invention is a process for the at least partial capture of arsenic and optionally of silicon in the hydrocarbon feedstock in the presence of hydrogen in order to produce an effluent having a reduced content of heavy metals and in particular of arsenic, with a limited loss in octane number. The capture process according to the invention makes it possible to remove the arsenic and also to limit the rate of hydrogenation of the monoolefins. The rate of hydrogenation of the olefins is advantageously less than 50%, preferentially less than 30%, and more preferably still less than 20%.

The hydrocarbon feedstock to be treated is advantageously a catalytic cracking gasoline from catalytic cracking, thermal cracking or steam cracking units. The process can also be applied to the treatment of mixtures of direct distillation gasolines which may contain heavy metals resulting from crude oil with cracking gasolines comprising monoolefins and diolefins. Preferably, the hydrocarbon feedstock to be treated is a catalytic cracking gasoline comprising between 5% and 60% by weight of monoolefins, between 50 ppm and 6000 ppm by weight of sulfur compounds and between 10 and 1000 ppb by weight of arsenic. The sulfur compounds contained in the hydrocarbon feedstock to be treated can be organic sulfur compounds, such as, for example, mercaptans, thiophene compounds, benzothiophene compounds and other aromatic sulfur compounds, disulfide compounds, and the like. The arsenic compounds contained in the hydrocarbon feedstock to be treated can be organic arsenic compounds, such as, for example, trimethylarsine or triethylarsine. Monoolefins denote hydrocarbon molecules exhibiting a single carbon-carbon double bond and diolefins are hydrocarbon molecules comprising at least two carbon-carbon double bonds. The monoolefins and the diolefins can be linear, branched and/or cyclic hydrocarbon molecules.

The capture mass according to the invention is advantageously implemented under operating conditions such that the rate of capture of arsenic is maximized, while limiting the rate of hydrogenation of the olefins. The contacting operation is generally carried out at a temperature of between 200 and 400° C., at a pressure of between 0.2 and 5 MPa and with a ratio of the flow rate of hydrogen to the flow rate of hydrocarbon feedstock of between 50 and 800 $Nm^3/m^3$. The hydrogen used can result from any hydrogen source. Preferably, fresh hydrogen resulting from the refinery and/or recycled hydrogen from a hydrodesulfurization unit, preferably from the unit for hydrodesulfurization of the hydrocarbon cut to be purified, is used.

Several reactor technologies can be envisaged for carrying out the capture of arsenic from a hydrocarbon feedstock in the presence of the capture mass according to the invention, the most conventional and most widespread technology being the fixed-bed technology. In this case, a reactor is charged with the capture mass according to the invention and a hydrodesulfurization catalyst, operating in adsorption of arsenic and in hydrodesulfurization, in principle until the appearance of arsenic in the outlet effluent (a phenomenon known to a person skilled in the art under the term breakthrough). In some cases, the total amount of poisoned capture mass can be replaced by an equivalent amount of fresh capture mass. The choice of a technology for replacing the capture mass according to the invention is not regarded within the context of the present invention as a limiting element. The capture mass can be employed in a moving bed reactor, that is to say that the spent capture mass is withdrawn continuously and replaced by fresh capture mass. This type of technology makes it possible to maintain the capture of arsenic by the capture mass and to avoid the breakthrough of the arsenic into the effluents produced. Among other solutions, mention may be made of the use of expanded bed reactors which also makes possible continuous withdrawal and topping-up of the capture mass in order to maintain the hydrodesulfurization activity of the capture mass.

The capture process according to the invention is preferably coupled with at least one additional stage of selective hydrogenation or catalytic hydrodesulfurization which is carried out on the effluent resulting from the operation of bringing into contact with the capture mass according to the invention. Thus, the stage of treatment of the hydrocarbon feedstock by the capture mass is regarded as a pretreatment which makes it possible in particular to preserve the catalytic activity of the catalyst used in the subsequent stage of selective hydrogenation or hydrodesulfurization. Thus, the capture process according to the invention comprises one or more other additional stages of selective hydrogenation or hydrodesulfurization in which the effluent resulting from bringing the hydrocarbon feedstock into contact with the capture mass according to the invention is brought into contact with at least one other catalyst for selective hydrogenation or hydrodesulfurization of the diolefins present in the feedstock. Said additional hydrodesulfurization stage(s) make(s) it possible to remove the residual sulfur compounds contained in the effluent depleted in arsenic and having a lower content of sulfur. Some of these residual sulfur compounds can result from the addition of $H_2S$ to the olefins present in the feedstock. $H_2S$ can be formed during the operation in which the hydrocarbon feedstock is brought into contact with the capture mass, that is to say during the capture of arsenic. Said additional hydrodesulfurization stage(s) is (are) implemented when the effluent resulting from the operation in which the hydrocarbon feedstock is brought into contact with the capture mass generally exhibits a sulfur content of greater than 10 ppm and when it is necessary to produce gasolines having a low sulfur content meeting the current specifications, which in many countries are below 10 ppm. The effluent freed of arsenic and from a part of the sulfur compounds is then treated in at least one of said additional stages of selective hydrodesulfurization. In said stage(s), said effluent is brought into contact with at least one other hydrodesulfurization catalyst under operating conditions which may be identical to or different from those under which the hydrocarbon feedstock was brought into contact with the capture mass.

The catalyst(s) used in said additional hydrodesulfurization stage(s) is (are) protected from deactivation by the arsenic present in the feedstock by virtue of the capture mass according to the invention. Thus, very selective hydrodesulfurization catalysts which are sensitive to the presence of arsenic can be employed in said additional hydrodesulfurization stage(s). Any hydrodesulfurization catalyst can be used in said additional hydrodesulfurization stage(s). Preferably, use is made of catalysts which have high selectivity with respect to the hydrodesulfurization reactions, in comparison with the olefin hydrogenation reactions. Such catalysts comprise at least one porous and amorphous mineral support, a group VIB metal, a group VIII metal. The group VIB metal is preferentially molybdenum or tungsten and the group VIII metal is preferentially nickel or cobalt. The support is generally selected from the group constituted by aluminas, silica, silica-aluminas, silicon carbide, titanium oxides, alone or as a mixture with alumina or silica-alumina, and magnesium oxides, alone or as a mixture with alumina or silica-alumina. Preferably, the support is selected from the group constituted by aluminas, silica and silica-aluminas. Preferably, the hydrodesulfurization catalyst used in the additional hydrodesulfurization step(s) has the following features:
  the content of elements of Group VIb is between 1% and 20% by weight of oxides of elements of Group VIb;
  the content of elements of Group VIII is between 0.1% and 20% by weight of oxides of elements of Group VIII;
  the molar ratio (elements of Group VIII/elements of Group VIb) is between 0.1 and 0.8.

A very preferred hydrodesulfurization catalyst comprises cobalt and molybdenum and has the abovementioned features. Furthermore, the hydrodesulfurization catalyst may comprise phosphorus. In this case, the phosphorus content is preferably between 0.1% and 10% by weight of $P_2O_5$, relative to the total weight of catalyst, and the mole ratio of phosphorus to group VIB elements is greater than or equal to 0.25, preferably greater than or equal to 0.27.

In said additional hydrodesulfurization stage(s), the effluent depleted in arsenic resulting from bringing the hydrocarbon feedstock into contact with the capture mass according to the invention is brought into contact with at least one other selective hydrodesulfurization catalyst under the following operating conditions:
  a temperature of between approximately 210° C. and approximately 410° C., preferentially between 240° C. and 360° C.;
  a total pressure of between 0.2 and 5 MPa and more preferentially between 0.5 and 3 MPa;

a volume of hydrogen per unit volume of hydrocarbon feedstock ratio of between 50 and 800 Nm³/m³ and more preferentially between 60 and 600 Nm³/m³.

In an alternative form of the process according to the invention, the operating conditions for bringing the hydrocarbon feedstock into contact with the capture mass according to the invention are identical to those employed in said additional hydrodesulfurization stage(s).

According to another embodiment, the stage of hydrotreating the effluent resulting from the stage of capture by means of the capture mass according to the invention is a selective hydrogenation which makes possible the hydrogenation of the diolefins to give olefins and optionally of the unsaturated sulfur compounds but also the conversion (increased weight) of the light sulfur compounds (i.e., having a lower temperature than that of thiophene) into sulfur compounds having a temperature greater than that of thiophene, for example by addition of mercaptans to olefins. This hydrogenation stage is carried out in the presence of hydrogen and of a catalyst containing at least one metal of Group VIb and at least one non-noble metal of Group VIII deposited on a porous support. Preferably, a catalyst is used for which:

- the content by weight of oxide of the element of Group VIb is between 6% and 18%, with respect to the weight of the catalyst;
- the content by weight of oxide of the element of Group VIII is between 4% and 12%, with respect to the weight of the catalyst;
- the specific surface area of the catalyst is between 200 and 270 m²/g;
- the density of the element of Group VIb, expressed as being the ratio of said content by weight of oxide of the element of Group VIb to the specific surface area of the catalyst, is between 4 and $6.10^{-4}$ g/m²;
- the molar ratio of the metal of Group VIII to the metal of Group VIb is between 0.6 and 3 mol/mol.

The metal of Group VIb is preferably chosen from molybdenum and tungsten; very preferably, the metal of Group VIb is molybdenum. The metal of Group VIII is preferably nickel and/or cobalt, very preferably nickel. The hydrogen is generally introduced in a slight excess, up to 5 moles per mol, with respect to the stoichiometry, necessary to hydrogenate the diolefins (one mole of hydrogen per mol of diolefin). The mixture consisting of gasoline and hydrogen is brought into contact with the catalyst under a pressure of between 0.5 and 5 MPa, a temperature of between 80° C. and 220° C., with a liquid space velocity (LHSV) of between 1 and 10 h⁻¹, the liquid space velocity being expressed in liter of feedstock per liter of catalyst and per hour (l/l·h).

In an alternative form of the process according to the invention, the capture mass according to the invention can be placed in the position of a guard bed of one or more reactors containing the catalyst(s) employed in said additional stage(s) of selective hydrogenation and/or hydrodesulfurization. In another alternative form of the process according to the invention, the capture mass according to the invention is placed in a "capture" reactor. This reactor is separate from and is placed upstream of the reactor(s) containing the catalyst(s) employed in said additional stage(s) of selective hydrogenation and/or hydrodesulfurization. In all the alternative forms of the process according to the invention employing at least one additional stage of selective hydrogenation and/or hydrodesulfurization, the ratio of volume of the capture mass according to the invention with respect to the volume of the catalyst(s) employed in said additional stage(s) of selective hydrogenation and/or hydrodesulfurization is advantageously between 4% and 50%, preferably between 5% and 40%, more preferably between 5% and 35%.

Scavenging Mass

The capture mass used in the context of the process according to the invention comprises an active phase comprising nickel, optionally at least one additional element from Group VIII, optionally at least one element from Group VIb, and optionally phosphorus.

The nickel content, expressed in NiO form, is advantageously between 5 and 65% by weight relative to the total weight of the capture mass, preferably between 10 and 30% by weight.

The content of additional Group VIII element, when it is present and expressed in oxide form, is advantageously between 0.5 and 10% by weight relative to the total weight of the capture mass.

The content of Group VIb element, when it is present and expressed in oxide form, is advantageously between 2 and 20% by weight relative to the total weight of the capture mass.

The phosphorus content, when it is present and expressed in oxide form, is between 0.2 and 10% by weight relative to the total weight of the capture mass.

In one embodiment according to the invention, the active phase consists solely of nickel. The nickel content, expressed in NiO form, is advantageously between 5 and 65% by weight relative to the total weight of the capture mass, preferably between 10 and 30% by weight.

In one embodiment according to the invention, the active phase comprises nickel, cobalt, molybdenum and phosphorus. The nickel content expressed in NiO oxide form is advantageously between 5 and 65% by weight relative to the total weight of the capture mass, preferably between 10 and 30% by weight. The cobalt content expressed in CoO form is advantageously between 0.5 and 10% by weight relative to the total weight of the capture mass, preferably between 0.5 and 5% by weight. The molybdenum content expressed in MoO₃ form is advantageously between 2 and 20% by weight relative to the total weight of the capture mass, preferably between 3 and 15% by weight. The phosphorus content expressed in P₂O5 form is advantageously between 0.2 and 10% by weight relative to the total weight of the capture mass, preferably between 0.5 and 5% by weight.

The capture mass generally comprises a specific surface area of between 50 and 200 m²/g, preferably between 60 and 170 m²/g and preferably between 70 and 130 m²/g.

The pore volume of the capture mass is generally between 0.5 mL/g and 1.3 mL/g, preferably between 0.6 mL/g and 1.1 mL/g.

Alumina Support

The alumina support of the capture mass used in the context of the process according to the invention is a macroporous and mesoporous alumina support comprising a bimodal distribution of mesopores in which:

- the volume of mesopores with a diameter greater than or equal to 2 nm and less than 18 nm corresponds to between 10 and 30% by volume of the total pore volume of said support;
- the volume of mesopores with a diameter greater than or equal to 18 nm and less than 50 nm corresponds to between 30 and 50% by volume of the total pore volume of said support;

the volume of macropores with a diameter greater than or equal to 50 nm and less than 8000 nm corresponds to between 30 and 50% by volume of the total pore volume of said support.

Preferably, the volume of the mesopores of the support with a diameter greater than or equal to 2 nm and less than 18 nm corresponds to between 15 and 25% by volume of the total porous volume of said support.

Preferably, the volume of the mesopores of the support with a diameter greater than or equal to 18 nm and less than 50 nm corresponds to between 35 and 45% by volume of the total porous volume of said support.

Preferably, the volume of the macropores of the support with a diameter greater than or equal to 50 nm and less than 8000 nm corresponds to between 35 to 50% by volume of the total porous volume of said support.

In one embodiment according to the invention, the porous distribution of the mesopores with a diameter greater than or equal to 2 nm and less than 18 nm is centered on a range of values between 10.5 and 14.5 nm, preferably between 12 and 13 nm.

In one embodiment according to the invention, the porous distribution of the mesopores with a diameter greater than or equal to 18 nm and less than 50 nm is centered on a range of values between 22 and 28 nm, preferably between 23 and 27 nm.

The support generally comprises a specific surface area of between 50 and 210 $m^2/g$, preferably between 70 and 180 $m^2/g$, and even more preferably between 70 and 160 $m^2/g$.

The porous volume of the support is generally between 0.7 mL/g and 1.3 mL/g, preferably between 0.8 mL/g and 1.2 mL/g.

Advantageously, the support is in the form of beads with a diameter of between 0.8 and 10 mm, preferentially between 1 and 5 mm, and more preferentially between 2 and 4 mm.

Support Preparation Process

The alumina support of the capture mass used in the context of the process according to the invention can be synthesized by any method known to those skilled in the art.

According to a preferred embodiment, the alumina support used according to the invention is in the form of beads. According to this preferred embodiment, the preparation of the support comprises the following steps:
 s1) dehydration of an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;
 s2) shaping of said alumina powder obtained in step s1) in the form of beads;
 s3) heat treatment of the alumina beads obtained in step s2) at a temperature greater than or equal to 200° C.;
 s4) hydrothermal treatment of the alumina beads obtained at the end of step s3) by impregnation with water or a preferentially acidic aqueous solution, then residence in an autoclave at a temperature between 100° C. and 300° C., preferably between 150° C. and 250° C.;
 s5) calcining of the alumina beads obtained at the end of step s4) at a temperature between 500° C. and 820° C.

Steps s1) to s5) are described in detail below.

Step s1)

According to step s1), dehydration of an aluminum hydroxide or an aluminum oxyhydroxide is carried out at a temperature between 400° C. and 1200° C., preferably between 600° C. and 900° C., for a period of between 0.1 second and 5 seconds, preferably between 0.1 second and 4 seconds, to obtain an alumina powder. The aluminum hydroxide can be chosen from hydrargillite, gibbsite or bayerite. The aluminum oxyhydroxide can be chosen from boehmite or diaspore.

Preferably, step s1) is carried out using hydrargillite.

Generally, step s1) is carried out in the presence of a current of hot gas, such as dry air or moist air, making it possible to quickly eliminate and entrain the evaporated water.

Generally, the active alumina powder obtained after the dehydration of the aluminum hydroxide or oxyhydroxide is ground to a particle size between 10 to 200 µm.

Generally, the active alumina powder obtained after the dehydration of aluminum hydroxide or oxyhydroxide is washed with water or an acidic aqueous solution. When the washing step is carried out with an aqueous acid solution, any mineral or organic acid may be used, preferably nitric acid, hydrochloric acid, perchloric or sulfuric acid for mineral acids, and a carboxylic acid (formic, acetic or malonic acid), a sulfonic acid (para-toluenesulfonic acid) or a sulfuric ester (lauryl sulfate) for organic acids.

Step s2)

According to step s2), said alumina powder obtained at the end of step s1) is shaped.

The shaping of said alumina powder is carried out so as to obtain beads, called granulation, is generally carried out by means of rotating technology such as a rotating granulator or a rotating drum. This type of process makes it possible to obtain beads of controlled diameter and pore distributions, these dimensions and these distributions being, in general, created during the agglomeration step.

The porosity can be created by different means, such as the choice of the particle size distribution of the alumina powder or the agglomeration of several alumina powders with different particle size distributions. Another method involves mixing with the alumina powder, before or during the agglomeration stage, one or more compounds known as pore forming compounds which disappear by heating and which thus create a porosity in the beads. As pore-forming compounds used, mention may be made, by way of example, of wood flour, charcoal, activated carbon, carbon black, sulfur, tars, plastic materials or emulsions of plastic materials such as polyvinyl chloride, polyvinyl alcohols, naphthalene or the like. The amount of pore-forming compounds added is determined by the desired volume to obtain beads with a raw filling density of between 500 and 1100 $kg/m^3$, preferably between 700 and 950 $kg/m^3$, and with a diameter of between 0.8 and 10 mm, preferably between 1 and 5 mm, and even more preferably between 2 and 4 mm. A selection by sieving of the beads obtained can be carried out according to the desired particle size.

Step s3)

According to step s3), a heat treatment is carried out on the alumina powder shaped in the form of beads obtained at the end of step s2) at a temperature greater than or equal to 200° C., preferably of between 200° C. and 1200° C., preferably between 300° C. and 900° C., very preferably between 400° C. and 750° C., for a period generally between 1 and 24 hours, preferably between 1 and 6 hours. The beads obtained at this intermediate step have a specific surface area between 50 and 420 $m^2/g$, preferably between 60 and 350 $m^2/g$, and even more preferably between 80 and 300 $m^2/g$.

Step s4)

According to step s4), the alumina beads obtained at the end of step s3) undergo a hydrothermal treatment by impregnation with water or a preferably acidic aqueous solution, then stay in an autoclave at a temperature of between 100° C. and 300° C., preferably between 150° C. and 250° C.

The hydrothermal treatment is generally carried out at a temperature of 100° C. to 300° C., preferentially from 150° C. to 250° C., for a duration greater than 45 minutes, preferentially from 1 to 24 hours, very preferentially from 1.5 to 12 hours. The hydrothermal treatment is generally carried out using an aqueous acid solution comprising one or more mineral and/or organic acids, preferably nitric acid, hydrochloric acid, perchloric acid, sulfuric acid, and weak acids whose solution has a pH lower than 4 such as acetic acid or formic acid. Generally, said acidic aqueous solution also comprises one or more compounds capable of releasing anions capable of combining with aluminum ions, preferably compounds comprising a nitrate ion (such as aluminum nitrate), chloride, sulfate, perchlorate, chloroacetate, trichloroacetate, bromoacetate, dibromoacetate, and the anions of general formula: R—COO like formates and acetates.

Step s5)

According to step s5), the alumina beads obtained at the end of step s4) undergo calcination at a temperature of between 500° C. and 820° C., preferably between 550° C. and 750° C., and for a period generally between 1 hour and 24 hours, preferably between 1 hour and 6 hours. At the end of this step, the alumina beads obtained comprise a specific surface area between 50 and 210 $m^2/g$, preferably between 70 and 180 $m^2/g$, and even more preferably between 70 and 160 $m^2/g$.

Process for Preparing the Capture Mass

The metals of the active phase of the capture mass can be deposited on the support according to techniques well known to those skilled in the art, for example by impregnation from a solution of metal precursors. The impregnation can, for example, be carried out according to the known dry impregnation form, according to which the desired amount of elements in the form of soluble salts is introduced into the chosen solvent, for example demineralized water, so as to fill as exactly as possible the porosity of the support. The support thus filled with the solution is preferably dried.

The metals can be deposited in coimpregnation or by successive addition. Phosphorus can be added to the impregnation solution(s).

Advantageously, nickel nitrate, nickel hydroxide or nickel carbonate are used as precursor of the active phase of nickel.

When the active phase comprises cobalt as an additional Group VIII element, cobalt nitrate, cobalt hydroxide or cobalt carbonate is advantageously used as precursor.

When the active phase comprises molybdenum as a Group VIb metal, the precursor used is advantageously ammonium heptamolybdate or molybdenum oxide $MoO_3$.

When phosphorus is present in the active phase, phosphoric acid is advantageously used as precursor. Any other salt known to those skilled in the art having sufficient solubility in aqueous solution and decomposable during a drying step or any type of oxidizing treatment can also be used.

After introduction of nickel, optionally at least one Group VIII metal, optionally at least one Group VIb metal and optionally phosphorus, the capture mass is preferably subjected to a calcining treatment. The aim of this treatment is to transform the molecular precursors of the metals into the oxide phase. This treatment in this case is an oxidizing treatment, but a simple drying of the capture mass can also be carried out. Preferably, the capture mass is subjected to a calcination treatment, prior to its usage in the process according to the invention. Said calcination treatment is advantageously carried out in air or in dilute oxygen, at a temperature of between 200° C. and 550° C., preferably between 300° C. and 500° C. After calcination, the metals deposited on the support are in the form of oxide.

Advantageously, the calcined capture mass is also subjected to a sulfurization treatment before its usage in the process according to the invention. Sulfurization is carried out in a sulfur-reducing medium, i.e. in the presence of $H_2S$ and hydrogen, in order to convert metal oxides into transition metal sulfides such as $MoS_2$, $Ni_3S_2$ and $Co_9S_8$. Sulfurization is carried out by injecting, onto the capture mass, a stream containing $H_2S$ and hydrogen, or else a sulfur compound capable of decomposing to give $H_2S$ in the presence of the capture mass and of hydrogen. Polysulfides, such as dimethyl disulfide, are $H_2S$ precursors commonly used to sulfide catalysts. The temperature is adjusted in order for the $H_2S$ to react with the metal oxides to form metal sulfides. This sulfurization can be carried out in situ or ex situ (inside or outside the hydrodesulfurization reactor) at temperatures between 200 and 600° C. and more preferably between 250° C. and 500° C. To be active, the metals should preferably be substantially sulfurized. The degree of sulfurization of the metals constituting the active phase of the capture mass is advantageously at least equal to 60%, preferably at least equal to 80%. The sulfur content in the sulfurized material is measured by elemental analysis according to ASTM D5373. A metal is considered sulfurized when the overall sulfurization rate defined by the molar ratio between the sulfur (S) present on the capture mass and said metal is at least equal to 60% of the theoretical molar ratio corresponding to the total sulfurization of the metal(s) considered. The overall degree of sulfurization is defined by the following equation:

$$(S/\text{element})_{capture\ mass} \geq 0.6 \times (S/\text{element})_{theoretical}$$

with:

$(S/\text{element})_{capture\ mass}$ molar ratio between sulfur (S) and the element present on the capture mass.

$(S/\text{element})_{theoretical}$ molar ratio between sulfur and the element corresponding to the total sulfurization of the element to give sulfide.

This theoretical molar ratio varies according to the element under consideration:

$(S/Co)_{theoretical} = 8/9$
$(S/Ni)_{theoretical} = 1/1$
$(S/Mo)_{theoretical} = 2/1$ After sulfurization, the capture mass is ready to be used in the process according to the invention.

The invention is illustrated by the examples that follow.

EXAMPLES

The invention is illustrated by the examples that follow.

Example 1: Capture Mass A (According to the Invention)

The support S1 of the arsenic capture mass A is prepared by dehydration of hydrargillite (EMPLURA®, Merck) to obtain an alumina powder. The temperature is set at 800° C. and the contact time of the material to be dehydrated with a flow of dry air is 1 second. The alumina powder obtained is ground to a particle size of between 10 to 200 μm and then washed three times with a volume of distilled water equal to twice the volume of the powder used. Said alumina powder is shaped in the presence of carbon black (N990 Thermax®) with a plate granulator (GRELBEX P30) equipped with a conical cylindrical bowl at an angle of 30° and a rotation speed of 40 revolutions per minute so as to obtain beads with a diameter mainly between 2 and 4 mm after sieving of the solid. The amount of carbon black is adjusted to obtain a raw filling density of the objects of 800 kg/m³. Said beads undergo a heat treatment in air at 720° C. so as to give them a specific surface area of 200 m²/g. Next, a hydrothermal treatment is applied to said beads by impregnation of the pore volume with an aqueous solution of nitric acid (0.1N, Merck™). The hydrothermal treatment is carried out at a temperature of 200° C. for 6.5 hours, in a rotating basket autoclave. The beads thus obtained undergo a final calcination treatment in air at 650° C. for 2 hours. The support S1 has a specific surface area of 141 m²/g, a total pore volume of 0.97 mL/g and also the following pore distribution as given by mercury porosimetry:

a volume of mesopores with a diameter greater than or equal to 2 nm and less than 18 nm, whose pore distribution is centered on 13 nm, of 0.15 mL/g, corresponding to 15% of the total pore volume;

a volume of mesopores with a diameter greater than or equal to 18 nm and less than 50 nm, whose pore distribution is centered on 26 nm, of 0.43 mL/g, corresponding to 44% of the total pore volume;

a volume of macropores with a diameter greater than or equal to 50 nm and less than 8000 nm of 0.39 mL/g, corresponding to 40% of the total pore volume.

The arsenic capture mass A is obtained by double dry impregnation of the alumina support via an aqueous solution of nickel nitrate. The support S1 exhibits a water uptake volume of 0.95 mL/g. The impregnation solution is prepared by diluting 18.24 grams of nickel nitrate ($Ni(NO_3)_2$, $6H_2O$, 99.5%, Merck™) in 37.2 mL of distilled water. After dry impregnation of 40 grams of support and a maturation step for 12 hours in an atmosphere saturated with humidity, the solid is dried for 12 hours at 120° C. to obtain a catalyst precursor. A second impregnation step is carried out with a solution prepared by diluting 19.35 grams of nickel nitrate ($Ni(NO_3)_2$, $6H_2O$, 99.5%, Merck™) in 33.7 mL of distilled water. After dry impregnation of the catalyst precursor and a maturation step for 12 hours in an atmosphere saturated with humidity, the solid is dried for 12 hours at 120° C. The solid is then calcined in air at 450° C. for 2 hours. The arsenic capture mass A obtained contains 20% by weight of NiO relative to the total weight of the capture mass. The arsenic capture mass A has a total pore volume of 0.87 mL/g and a specific surface area of 112 m²/g.

Example 2: Capture Mass B Non-Compliant (Macroporous and Large Monomodal Mesoporous Capture Mass)

The support S2 of the capture mass B is prepared by dehydration of hydrargillite (EMPLURA®, Merck™) in order to obtain an active alumina powder. The temperature is set at 800° C. and the contact time of the material to be dehydrated with a flow of dry air is 1 second. The active alumina powder obtained is ground to a particle size of between 10 to 200 µm and then washed three times with a volume of distilled water equal to twice the volume of the powder used. Said active alumina powder is shaped with a plate granulator (GRELBEX™ P30) equipped with a conical cylindrical bowl at an angle of 30° and a rotation speed of 40 revolutions per minute so as to obtain beads with a diameter mainly between 2 and 4 mm (after sieving of the solid) and a raw filling density of the objects of 780 kg/m³. Said beads undergo a heat treatment in air at 700° C. so as to give them a specific surface area of 250 m²/g. Next, a hydrothermal treatment is applied to said beads by impregnation of the pore volume with an aqueous solution of nitric acid (0.1N, Merck™). The hydrothermal treatment is carried out at a temperature of 200° C. for 6.5 hours, in a rotating basket autoclave. The beads thus obtained undergo a final calcination treatment in air at 950° C. for 2 hours. The support S2 has a specific surface area of 71 m²/g, a total pore volume of 0.56 mL/g and also the following pore distribution as given by mercury porosimetry:

a volume of mesopores with a diameter greater than or equal to 10 nm and less than 50 nm, whose pore distribution is centered on 20 nm, of 0.35 mL/g, corresponding to 63% of the total pore volume;

a volume of macropores with a diameter greater than or equal to 50 nm and less than 8000 nm of 0.21 mL/g, corresponding to 38% of the total pore volume.

The arsenic capture mass B is obtained by double dry impregnation of the alumina support via an aqueous solution of nickel nitrate. The support S2 exhibits a water uptake volume of 0.54 mL/g. The impregnation solution is prepared by dissolving 18.24 grams of nickel nitrate hexahydrate (Sigma-Aldrich™, purity≥98.5%) in 20.8 mL of distilled water. After dry impregnation of 40 grams of support and a maturation step for 12 hours in an atmosphere saturated with humidity, the solid is dried for 12 hours at 120° C. to obtain a catalyst precursor. A second impregnation step is carried out with a solution prepared by diluting 19.35 grams of nickel nitrate ($Ni(NO_3)_2$, $6H_2O$, 99.5%, Merck™) in 17.5 mL of distilled water. The arsenic capture mass B obtained contains 20% by weight of NiO relative to the total weight of the capture mass. The arsenic capture mass B has a total pore volume of 0.48 mL/g and a specific surface area of 66 m²/g.

Example 3: Evaluation of the Arsenic Capture Performance of the Capture Masses

Prior to their introduction into the reactor for the arsenic capture test, the capture masses A and B are sulfurized ex situ under a flow of an $H_2/H_2S$ mixture containing 15% by volume of $H_2S$ and at a temperature of 350° C. for 2 hours, then cooled under pure hydrogen with a plateau of 2 hours at 200° C.

The arsenic capture performance test involves monitoring the rate of disappearance of an arsenic compound dissolved in a model feedstock. The reaction is carried out in static mode in a stirred and closed autoclave reactor, at a temperature of 210° C., in the presence of hydrogen and under a total pressure of 35 bar (3.5 MPa). The model feedstock consists of a volume of 250 cm³ of toluene, i.e. 217 g, and of triphenyl-arsine ($AsPh_3$), at a content of 500 ppm by weight in "As" equivalent, that is to say approximately 1.45 mmol of As. The mass of solid used is adjusted so as to obtain an initial Ni/As molar ratio of 5.

TABLE 1

| Body | A (according to the invention) | B (comparative) |
|---|---|---|
| Volume of the mesopores of the support with a diameter greater than or equal to 2 nm and less than 18 nm | 15% | — |

TABLE 1-continued

| Body | A (according to the invention) | B (comparative) |
|---|---|---|
| Volume of mesopores of the support with a diameter greater than or equal to 18 nm and less than 50 nm | 44% | 63% |
| Volume of the macropores of the support with a diameter greater than or equal to 50 nm and less than 8000 nm | 40% | 38% |
| Total pore volume of the support (mL/g) | 0.87 | 0.48 |
| $S_{BET}$ Support (m$^2$.g$^{-1}$) | 112 | 66 |
| NiO content (%) | 20 | 20 |
| Relative rate of disappearance of As | 100 | 83 |

Example 4: Evaluation of the Olefin Hydrogenation Performance

A catalytic cracking (FCC or Fluid Catalytic Cracking) gasoline, the characteristics of which are collated in the table below, is brought into contact with the different capture masses. The reaction is carried out in a reactor of traversed bed type under the following conditions: P=2 MPa, H$_2$/HC=360 litres/litres of hydrocarbon feedstock, HSV=10 h$^{-1}$, the temperature being set at 250° C. The effluents are analyzed by gas chromatography to determine the hydrocarbon concentrations.

TABLE 2

| S ppm | 392 |
|---|---|
| Aromatics wt % | 41.3 |
| Paraffins wt % | 27.2 |
| Naphthenics wt % | 11.0 |
| Olefins wt % | 20.5 |
| T$_5$ ° C. (ASTM D-2887) | 62 |
| T$_{95}$ ° C. (ASTM D-2887) | 225 |

For all the masses tested, the hydrogenation of the olefins is extremely low and less than 2% by weight relative to the total weight of the olefins.

The invention claimed is:

1. A process for capturing organometallic impurities in a gasoline-type hydrocarbon feedstock containing sulfur compounds and olefins, comprising:
bringing a capture mass into contact with a feedstock to be treated and a flow of hydrogen at a temperature between 200 and 400° C., a pressure of between 0.2 and 5 MPa and a ratio of the hydrogen flow rate to the hydrocarbon feedstock flow rate of between 50 and 800 Nm$^3$/m$^3$,
said capture mass comprising an active phase based on nickel, and a support of mesoporous and macroporous alumina comprising a bimodal distribution of mesopores, and in which:
the volume of the mesopores with a diameter greater than or equal to 2 nm and less than 18 nm corresponds to between 10 and 30% by volume of the total pore volume of said support;
the volume of the mesopores with a diameter greater than or equal to 18 nm and less than 50 nm corresponds to between 30 and 50% by volume of the total pore volume of said support;
the volume of the macropores with a diameter greater than or equal to 50 nm and less than 8000 nm corresponds to between 30 and 50% by volume of the total pore volume of said support,
wherein said support is in the form of beads with a diameter of between 2 and 4 mm and said support is obtained according to the following method:
s1) dehydration of an aluminum hydroxide or an aluminum oxyhydroxide at a temperature of between 400° C. and 1200° C., for a time of between 0.1 second and 5 seconds, to obtain an alumina powder;
s2) shaping of said alumina powder obtained in s1) in the form of beads;
s3) heat treatment of the alumina beads obtained in s2) at a temperature greater than or equal to 200° C.;
s4) hydrothermal treatment of the alumina beads obtained at the end of s3) by impregnation with water or an aqueous solution, then residence in an autoclave at a temperature between 100° C. and 300° C.;
s5) calcining of the alumina beads obtained at the end of s4) at a temperature between 500° C. and 820° C.

2. The process as claimed in claim 1, wherein said support has a specific surface area of between 50 and 210 m$^2$/g.

3. The process as claimed in claim 1, wherein said support has a total pore volume of between 0.7 and 1.3 mL/g.

4. The process as claimed claim 1, wherein the volume of the mesopores with a diameter greater than or equal to 2 nm and less than 18 nm corresponds to between 15 and 25% by volume of the total pore volume of said support.

5. The process as claimed in claim 1, wherein the volume of the mesopores with a diameter greater than or equal to 18 nm and less than 50 nm corresponds to between 35% and 45% by volume of the total pore volume of said support.

6. The process as claimed in claim 1, wherein the volume of the macropores with a diameter greater than or equal to 50 nm and less than 8000 nm corresponds to between 35 to 50% by volume of the total pore volume of said support.

7. The process as claimed in claim 1, wherein the nickel content, expressed in NiO form, is between 5 and 65% by weight relative to the total weight of said capture mass.

8. The process as claimed in claim 1, wherein the active phase consists solely of nickel.

9. The process as claimed in claim 1, wherein the active phase of said capture mass further comprises cobalt, molybdenum and phosphorus.

10. The process as claimed in claim 9, wherein the nickel content, expressed in NiO oxide form, is between 5 and 65% by weight relative to the total weight of said capture mass, the cobalt content, expressed in CoO form, is between 0.5 and 10% by weight relative to the total weight of said capture mass, the molybdenum content, expressed in MoO$_3$ form, is between 2 and 20% by weight relative to the total weight of said capture mass, and the phosphorus content, expressed in P$_2$O$_5$ form, is between 0.2 and 10% by weight relative to the total weight of said capture mass.

11. The process as claimed in claim 1, wherein the pore distribution of the mesopores with a diameter greater than or equal to 2 nm and less than 18 nm is centered on a range of values between 10.5 and 14.5 nm.

12. The process as claimed in claim 1, wherein the pore distribution of the mesopores with a diameter greater than or equal to 18 nm and less than 50 nm is centered on a range of values of between 22 and 28 nm.

13. The process as claimed in claim 1, wherein said support comprises a specific surface area of between 70 and 180 m2/g.

14. The process as claimed in claim 1, wherein said support is in the form of beads with a diameter of between 2 and 4 mm.

15. The process as claimed in claim 1, wherein the hydrocarbon feedstock is a catalytic cracking gasoline containing between 5% and 60% by weight of monoolefins, between 50 and 6000 ppm by weight of sulfur compounds and between 10 and 1000 ppb of arsenic relative to the total weight of said feedstock.

16. The process as claimed in claim 1, wherein the organometallic impurities are selected from organometallic impurities of heavy metals, silicon, phosphorus and arsenic.

17. The process as claimed in claim 1, wherein the dehydration of aluminum hydroxide or aluminum oxyhydroxide is performed at a temperature of between 600° C. and 900° C.

18. The process as claimed in claim 1, wherein the dehydration of aluminum hydroxide or aluminum oxyhydroxide is performed for a time of between 0.1 second and 4 seconds.

19. The process as claimed in claim 17, wherein the dehydration of aluminum hydroxide or aluminum oxyhydroxide is performed for a time of between 0.1 second and 4 seconds.

* * * * *